(12) United States Patent
Ries et al.

(10) Patent No.: US 9,139,964 B2
(45) Date of Patent: Sep. 22, 2015

(54) SYSTEM FOR ADJUSTING THE PRESSURE AND TEMPERATURE OF A COMPACTING MEMBER

(71) Applicant: Caterpillar Paving Products Inc., Brooklyn Park, MN (US)

(72) Inventors: Michael W. Ries, Coon Rapids, MN (US); Bryan J. Downing, Champlin, MN (US); Keng Y. Low, Maple Grove, MN (US); Jon M. Scharf, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 31 days.

(21) Appl. No.: 14/107,517

(22) Filed: Dec. 16, 2013

(65) Prior Publication Data

US 2015/0167258 A1 Jun. 18, 2015

(51) Int. Cl.
*E01C 19/26* (2006.01)
*E01C 19/23* (2006.01)
*E01C 19/29* (2006.01)
*F01N 5/02* (2006.01)

(52) U.S. Cl.
CPC ............ *E01C 19/238* (2013.01); *E01C 19/231* (2013.01); *E01C 19/266* (2013.01); *E01C 19/29* (2013.01); *F01N 5/02* (2013.01)

(58) Field of Classification Search
CPC ... E01C 19/231; E01C 19/238; E01C 19/266; E01C 19/29; F01N 5/02

USPC ........ 404/77, 79, 84.05, 95, 122, 129; 180/20
See application file for complete search history.

(56) References Cited

U.S. PATENT DOCUMENTS

| | | | | |
|---|---|---|---|---|
| 3,066,585 A | * | 12/1962 | Cumpton | 404/95 |
| 4,157,877 A | * | 6/1979 | Lee | 404/128 |
| 4,673,298 A | * | 6/1987 | Hunter et al. | 374/122 |
| 4,812,076 A | * | 3/1989 | Yant | 404/108 |
| 4,978,068 A | * | 12/1990 | Eldridge | 239/129 |
| 5,298,722 A | | 3/1994 | Tanaka | |
| 5,899,630 A | * | 5/1999 | Brock | 404/79 |
| 6,236,923 B1 | | 5/2001 | Corcoran et al. | |
| 7,234,730 B2 | * | 6/2007 | Bonutti | 280/757 |
| 8,443,852 B2 | | 5/2013 | McCaughey | |
| 8,668,405 B1 | * | 3/2014 | Singleton | 404/128 |
| 8,714,869 B1 | * | 5/2014 | Ries et al. | 404/79 |
| 8,838,347 B2 | * | 9/2014 | Norton et al. | 701/50 |
| 2002/0075145 A1 | * | 6/2002 | Hardman et al. | 340/442 |
| 2005/0205563 A1 | * | 9/2005 | Hepworth et al. | 219/679 |

FOREIGN PATENT DOCUMENTS

| | | |
|---|---|---|
| GB | 1260932 | 1/1972 |
| JP | 04402639 | 1/2010 |
| JP | 2010188927 | 9/2010 |
| JP | 2012096644 | 5/2012 |

* cited by examiner

*Primary Examiner* — Raymond W Addie
(74) *Attorney, Agent, or Firm* — Andrew A. Phillips

(57) ABSTRACT

A compactor includes a frame, an engine coupled to the frame, an exhaust system coupled to the engine and configured to remove heated exhaust air from the engine, a compacting member rotatably coupled to the frame and configured to rotate in contact with a substrate of paving material, and an air system. The air system couples the exhaust system to the compacting member.

21 Claims, 2 Drawing Sheets

SYSTEM FOR ADJUSTING THE PRESSURE AND TEMPERATURE OF A COMPACTING MEMBER

TECHNICAL FIELD

The present disclosure relates generally to a compaction machine, and relates more particularly to a system for adjusting the pressure and temperature of a compacting member.

BACKGROUND

Compaction machines, also variously called compactors and compactor machines, are frequently employed for compacting dirt, gravel, asphalt, and other compactable surfaces associated with roadbeds and other land areas. One such type of compaction machine is a drum-type compactor having one or more drums adapted to compact the particular surface over which the compactor is being driven. In order to compact the surface, the drum-type compactor may include a drum assembly having a vibratory mechanism that includes inner and outer eccentric weights arranged on rotatable shafts situated within the drum. Both amplitude and frequency of vibration may be controlled to establish desired degree of compaction.

Another type of compactor machine is a pneumatic wheel roller-style of compactor, which is dependent upon tire pressure for achieving effective compaction. For successful operation of the pneumatic compactor, the ground contact pressures should be managed in accordance with compaction surface type. Typically, an operator estimates a contact pressure based upon weight of the machine, air pressure of the tires, and compaction conditions in accordance with a chart provided by the machine manufacturer. Overall weight of the machine may be controlled by adding ballast such as sand and/or water, according to a specific ground compaction task. Pneumatic compactors may have an air system that monitors and maintains the pressure of the tires at a predetermined pressure.

Paving material is typically comprised of viscous hydrocarbons, and gravel or the like. The paving material is deposited at a relatively high temperature, and cools to harden into a finished product. It is well known that the hot, viscous hydrocarbon constituents of paving material can stick to machinery. Where paving material sticks to ground contacting parts of the machinery, such as the rotating drums or tires of compactors, the quality of the paving material mat can suffer, and continued operation of the machinery can itself be compromised. This problem is especially noted when the drums or tires of compactors are not at temperature. For example, if a pneumatic compactor is not warmed-up (i.e., operated) off-site, the tires are too cool and asphalt will stick to the tires. Having to warm up the compactor off-site is inefficient and costly.

Systems are available for pneumatic compactors to minimize the need for off-site operation. One method is to spray water or an emulsion onto the tires. Various on-board spray systems configured to spray water, release agents, and the like, onto rotating compacting members are used to prevent the paving material from adhering. For pneumatic compactors, it is typically unnecessary to continuously spray the tires to prevent sticking of the paving material, and thus the operator is often given control over the spray system to apply the liquid at his or her discretion. It is also known to install heaters on the pneumatic compactor above the tires to pre-heat them. Both of heating and spray systems involve adding external components to the compactor and added cost. It is also known to install heating elements within the tires as shown in JP2012096644, although this method is inefficient and costly to use in the paving field when the compactor is operating with temperatures much higher than anticipated for an automobile.

SUMMARY

In one aspect, a compactor includes a frame, an engine coupled to the frame, an exhaust system coupled to the engine and configured to remove heated exhaust air from the engine, a compacting member rotatably coupled to the frame and configured to rotate in contact with a substrate of paving material, and an air system. The air system couples the exhaust system to the compacting member.

In another aspect, a compactor includes a frame, an engine coupled to the frame, an exhaust system coupled to the engine and configured to remove heated exhaust air from the engine, a tire rotatably coupled to the frame and configured to rotate in contact with a substrate of paving material, an air system comprising a valve and an air compressor, a pressure sensor coupled to the tire and configured to measure the pressure of the tire, a temperature sensor coupled to the tire and configured to measure the temperature of the tire, and a controller. The air system couples the exhaust system to the compacting member. The controller is configured to receive the pressure of the tire from the pressure sensor, receive the temperature of the tire from the temperature sensor, actuate the valve and the air compressor to adjust the pressure of the tire to a first pressure, and actuate the valve and the air compressor to adjust the temperature of the tire to a first temperature.

In another aspect, a heating system for heating a compacting member of a compactor includes an air system for delivering heated exhaust air to a compacting member, a temperature sensor for measuring a temperature of the compacting member, a pressure sensor for measuring a pressure of the compacting member, and a controller in communication with the temperature sensor, pressure sensor, and air system. The controller is configured to control the pressure of the compacting member and control the temperature of the compacting member.

DETAILED DESCRIPTION

Figure 1:
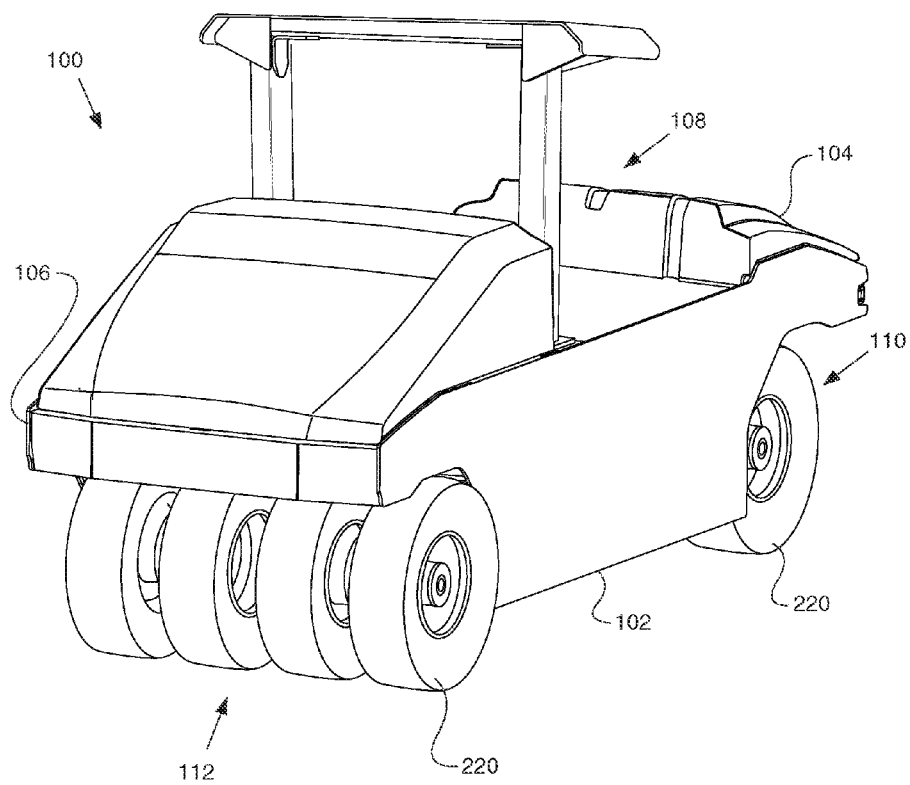
FIG. 1 is a diagrammatic view of a compactor according to one embodiment of the present disclosure.

Referring to FIG. 1, machine 100, shown as a pneumatic compactor, includes a frame 102 having a front frame end 104 and a back frame end 106. An operator control station 108 is coupled to frame 102 between front frame end 104 and back frame end 106 in a conventional manner. Machine 100 further includes a front compaction module 110 and a rear compaction module 112. Both front compaction module 110 and rear compaction module 112 are rotatably coupled to frame 102. In the embodiment shown in FIG. 1, both front compaction module 110 and rear compaction module 112 are each made up of four compacting members 220. In the exemplary embodiment, compacting member 220 is a pneumatic tire.

One of skill in the art will appreciate that machine 100 could be any type of compactor employing compacting member 220. And while front compaction module 110 and rear compaction module 112 are described as having four compacting members 220, front compaction module 110 and rear compaction module 112 could have any number of compacting members 220, and front compaction module 110 may have a different number of compacting members 220 than are present in rear compaction module 112.

Figure 2:
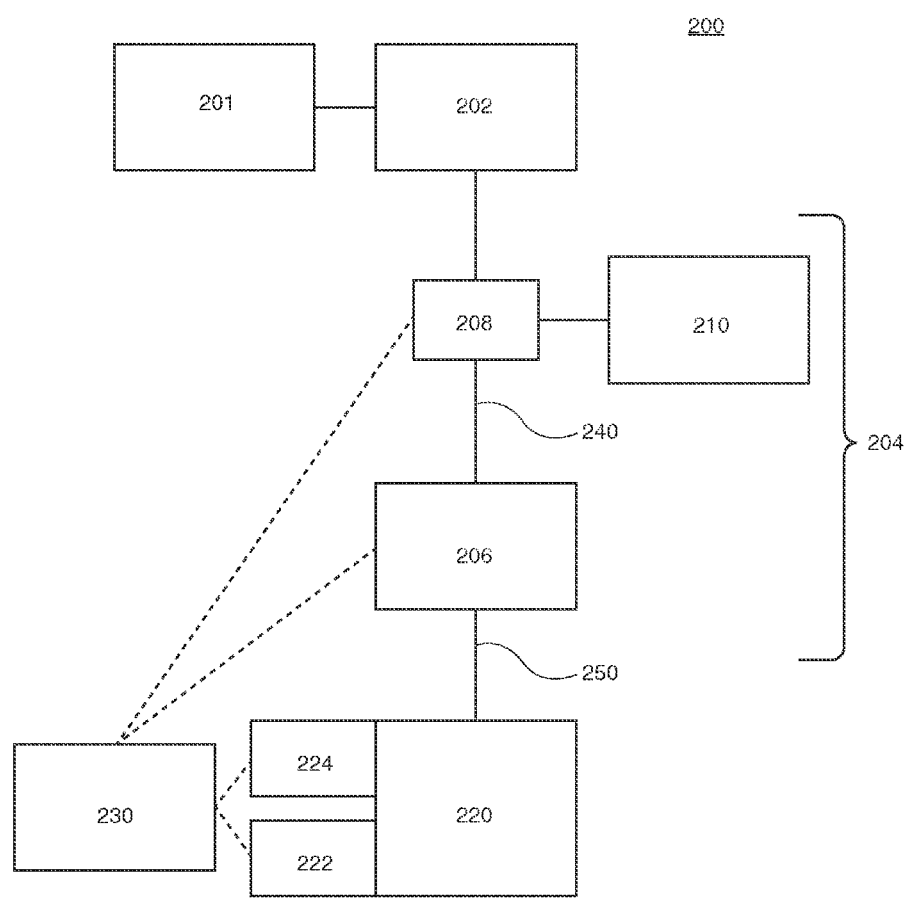
FIG. 2 is a diagrammatic view of a system according to the present disclosure for adjusting the temperature and pressure of a compacting member.

Machine 100 further includes a system 200 for adjusting pressure and temperature of compacting member 220 as illustrated in FIG. 2. Machine 100 has an engine 201 with an exhaust system 202. Exhaust system 202 carries away heated engine exhaust air. The heated exhaust air being removed from engine 201 is significantly higher than the temperature of the ambient air, and can be anywhere from 350-450° C. (662-842° F.). Exhaust system 202 is coupled to air system 204. Air system 204 is coupled to compacting member 220.

Air system 204 includes an air compressor 206, a valve 208, and an intake 210. Intake 210 allows ambient air to enter the air system. Valve 208 allows either heated exhaust air from engine 201 or ambient air from intake 210 to travel to air compressor 206 and ultimately to compacting member 220. Air compressor 206 has a compressor intake 240 and a compressor outlet 250. In an exemplary embodiment, valve 208 would be an electronic mixing valve to allow ambient air, exhaust air, or a mixture of the two to enter the intake of air compressor 206 to create the required temperature in compacting member 220. The pressure reached within compacting member 220 using air system 204 would range from 2-10 bar (29-145 psi).

Compacting member 220 is equipped with a pressure sensor 222 and a temperature sensor 224. Pressure sensor 222 monitors and measures the pressure of compacting member 220. Temperature sensor 224 monitors and measures the temperature of compacting member 220. Pressure sensor 222 and temperature sensor 224 are known in the art. Pressure sensor 222 and temperature sensor 224 are coupled to compacting member 220 in a way to ensure that each is taking accurate measurements of pressure and temperature representative of compacting member 220.

The system for adjusting pressure and temperature of compacting member 220 also includes a controller 230. Controller 230 is in communication with compressor 206, valve 208, pressure sensor 222, and temperature sensor 224 through either wired or wireless technologies known in the art. Controller 230 is a standard electronic control module known in the art.

INDUSTRIAL APPLICABILITY

In general, the present disclosure may prove particularly useful for pneumatic compactor machines. It may also be useful for other industrial machines, including but not limited to certain loaders and various work machines used in construction, agriculture, and industrial environments.

System 200 is for controlling the pressure and the temperature of compacting member 220. While the present disclosure has described system 200 with respect to a single compacting member 220, the present disclosure anticipates that system 200 may be used with multiple compacting members 220. For example, in a standard pneumatic compactor having four front tires and four rear tires, system 220 would have eight compacting members 220. Air compressor 206 is capable of directing either heated exhaust air, ambient air, or both heated exhaust air and ambient air to individual compacting members 220.

The pressure and temperature of compacting member 220 are altered by changes in either pressure, temperature, or both. So the addition of heated exhaust air or ambient air can affect both the pressure and temperature of compacting member 220. It will be appreciated by those skilled in the art that actual performance of machine 100 will vary as a function of the inflation pressure of compacting member 220 and the softness or hardness of the surface being compacted. Thus, low inflation pressure of compacting member 220 will generally improve traction and durability of a compactor machine on softer ground, for example, while higher inflation pressure of compacting member 220 will provide more efficient results on firmer surfaces. To the extent that the compaction surface may be softer and of lower density in early stages of the compaction process, the surface will generally become increasingly denser and hence more firm after several passes of machine 100 over the surface. As such, it may be advantageous to vary the compacting member 220 inflation pressure as a function of real-time density of the compaction surface.

Changes in temperature will cause corresponding changes to pressure of compacting member 220. Accordingly, with the present disclosure, operators of machine 100 would be able to automatically control the temperature of compacting member 220 as well as the pressure of compacting member 220 to prevent paving material from sticking to compacting member 220 and maintaining compacting member 220 at the proper pressure to accomplish machine 100's task.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A compactor comprising:
   a frame;
   an engine coupled to the frame;
   an exhaust system coupled to the engine and configured to remove a heated exhaust air from the engine;
   a compacting member rotatably coupled to the frame and configured to rotate in contact with a substrate of paving material; and
   an air system comprising:
      a controller; and
      a mixing valve;
      wherein the air system couples the exhaust system to the compacting member and the heated exhaust air and an ambient air are proportionally introduced into the compacting member.

2. The compactor of claim 1, wherein the compacting member is a tire configured to receive air.

3. The compactor of claim 2, wherein the air system comprises an air compressor.

4. The compactor of claim 2, further comprising a pressure sensor coupled to the compacting member and measuring the pressure of the compacting member.

5. The compactor of claim 4, further comprising a controller in communication with the pressure sensor, the air compressor, and the mixing valve;
   wherein the controller receives the pressure of the compacting member from the pressure sensor, and
   the controller actuates the air compressor and the mixing valve to pressurize the tire to a first pressure.

6. The compactor of claim 5, wherein the air system further comprises an intake configured to draw the ambient air.

7. The compactor of claim 6, further comprising a temperature sensor coupled to the compacting member and in communication with the controller;
wherein the controller receives the temperature of the compacting member from the temperature sensor, and
the controller actuates the air compressor and the mixing valve to adjust the temperature of the compacting member to a first temperature.

8. The compactor of claim 7, wherein the temperature of the compacting member is adjusted to the first temperature by the air system providing the heated exhaust air to the compacting member.

9. The compactor of claim 8, wherein the temperature of the compacting member is adjusted to the first temperature by the air system providing the ambient air to the compacting member.

10. A compactor comprising:
a frame;
an engine coupled to the frame;
an exhaust system coupled to the engine and configured to remove a heated exhaust air from the engine;
a tire rotatably coupled to the frame and configured to rotate in contact with a substrate of paving material;
an air system comprising a mixing valve and an air compressor, wherein the air system couples the exhaust system to the tire;
a pressure sensor coupled to the tire and configured to measure the pressure of the tire;
a temperature sensor coupled to the tire and configured to measure the temperature of the tire; and
a controller that proportionally introduces the heated exhaust air and an ambient air into the tire, wherein the controller is configured to:
receive the pressure of the tire from the pressure sensor;
receive the temperature of the tire from the temperature sensor;
actuate the mixing valve and the air compressor to adjust the pressure of the tire to a first pressure; and
actuate the mixing valve and the air compressor to adjust the temperature of the tire to a first temperature.

11. The compactor of claim 10, wherein the air system further comprises an intake configured to draw the ambient air.

12. The compactor of claim 11, wherein if the temperature of the tire is below the first temperature, the actuation of the mixing valve and the air compressor allows the heated exhaust air into the tire.

13. The compactor of claim 12, wherein if the temperature of the tire is above the first temperature and a second temperature, wherein the second temperature is greater than the first temperature, the actuation of the mixing valve and the air compressor allows the ambient air into the tire.

14. The compactor of claim 13, wherein if the pressure is below the first pressure, the actuation of the mixing valve and the air compressor allows the heated exhaust air into the tire.

15. The compactor of claim 14, wherein the air system is configured to decouple the tire from the air system if the pressure of the tire fills below a second pressure.

16. A heating system for heating a compacting member of a compactor, comprising:
an air system comprising a mixing valve for delivering a heated exhaust air and an ambient air into a compacting member;
a temperature sensor for measuring a temperature of the compacting member;
a pressure sensor for measuring a pressure of the compacting member; and
a controller in communication with the temperature sensor, pressure sensor, and air system, wherein the control proportionally introduces the heated exhaust air and the ambient air into the compacting member and is configured to:
control the pressure of the compacting member; and
control the temperature of the compacting member.

17. The system of claim 16, wherein the controller controls the pressure of the compacting member by actuating the mixing valve and an air compressor to allow heated exhaust air to the compacting member.

18. The system of claim 16, wherein the controller controls the pressure of the compacting member by actuating the mixing valve and an air compressor to allow an air in the compacting member to be released.

19. The system of claim 16, wherein the controller controls the pressure of the compacting member be selectively scaling off the compacting member from the air system when the pressure is below a minimum pressure.

20. The system of claim 17, wherein the controller controls the temperature of the compacting member by actuating the mixing valve and the air compressor to allow the heated exhaust air to the compacting member.

21. The system of claim 18, wherein the controller controls the temperature of the compacting member by actuating the mixing valve and the air compressor to allow an ambient air to the compacting member.

* * * * *